US006616866B1

(12) United States Patent
Crompton

(10) Patent No.: US 6,616,866 B1
(45) Date of Patent: Sep. 9, 2003

(54) FIRE BARRIER MATERIALS

(75) Inventor: Geoffrey Crompton, Southport (GB)

(73) Assignee: Wolstenholme International Limited, Lancashire (GB)

( * ) Notice: Subject to any disclaimer, the term of this patent is extended or adjusted under 35 U.S.C. 154(b) by 0 days.

(21) Appl. No.: 10/009,850

(22) PCT Filed: May 11, 2000

(86) PCT No.: PCT/GB00/01792

§ 371 (c)(1),
(2), (4) Date: Mar. 20, 2002

(87) PCT Pub. No.: WO00/68337

PCT Pub. Date: Nov. 16, 2000

(30) Foreign Application Priority Data

| May 11, 1999 | (GB) | ................................................ 9910774 |
| Feb. 28, 2000 | (GB) | ................................................ 0004567 |

(51) Int. Cl.⁷ ............................................... C09K 21/00
(52) U.S. Cl. ..................... 252/606; 524/430; 524/431; 524/432; 524/433; 524/492
(58) Field of Search ................................ 252/601, 606, 252/609; 524/430, 431, 432, 433, 492

(56) References Cited

U.S. PATENT DOCUMENTS

| 4,879,066 A | * | 11/1989 | Crompton |
| 5,175,197 A | | 12/1992 | Gestner et al. |
| 5,532,292 A | * | 7/1996 | Wainwright et al. |

FOREIGN PATENT DOCUMENTS

| EP | 0349320 | | 1/1990 |
| GB | 2234754 | | 2/1991 |
| WO | WO-004291 | * | 4/1991 |
| WO | 9104291 | | 4/1991 |
| WO | 9401492 | | 1/1994 |
| WO | 9402545 | | 2/1994 |

OTHER PUBLICATIONS

Parry, et al., "Ceepree: Unique Fire Barrier from a Versatile Filler", xp002145540, ICI Soda Ash Products, pp. 195–205, Date unknown.

"Patent Cooperation Treaty PCT International Search Report"; International Application No. PCT/GB00/01792; International Filing Date Nov. 5, 2000; Applicant: Crompton Design Manufacturing Limited et al.; pp. 1–4.

"Patent Cooperation Treaty PCT International Preliminary Examination Report"; PCT Article 36 and Rule 70; International Application No. PCT/GB00/01792: International Filing Date Nov. 5, 2000; Applicant: Wolstenholme International Limited et al.; pp. 1–9.

* cited by examiner

*Primary Examiner*—Margaret Medley
(74) *Attorney, Agent, or Firm*—Reed Smith LLP

(57) ABSTRACT

A fire barrier material comprising a combination of materials capable of melting progressively as the temperature rises under fire conditions, namely a relatively high melting devitrifying frit, one or more substances to reduce melt and flow temperature of the frit and, optionally, an intumescent substance and/or a pH buffer. The material is particularly suitable for use in thermoplastic materials.

18 Claims, No Drawings

FIRE BARRIER MATERIALS

This invention concerns fire barrier materials.

Fire barrier materials are known from GB2234754A in the form of compositions comprising two or more frits capable of melting progressively as the temperature rises in a fire situation; one of the frits being a relatively high melting devitrfying frit. The composition can be added to a variety of materials such as phenolic and polyester resins and sodium silicate, to provide or enhance fire resistance.

A preferred composition contains a relatively low melting frit that starts to melt at about 450° C. and a devitrifying frit that starts to melt at about 700° C. The devitrifying frit specifically solidifies or vitrifies to provide strength to the char forming a fused protective layer, thus starving the fire of oxygen and reducing smoke and toxic fume emissions as well as reducing the risk of flashover.

It is also known to add to such frit compositions intumescent substances, such as hydrated magnesium hydrated carbonate, calcium carbonate and alumina trihydrate. These intumescent substances give off water vapour and carbon dioxide in a fire situation and together with the frit composition help to stop flaming of the host material. Melamine phosphate as one intumescent additive and a combination of ammonium polyphosphate, melamine and pentaerythritol (trade name "Budit 3077") as another have been included in frit compositions to give an intumescent char in fire situations. Melamine phosphate mixed with a frit composition and a phosphate flame retardant in powder form has proved effective in both epoxy and polyester resins.

Frit compositions of the type described above are sold under the trade mark CEEPREE and have been used in coatings, paints, sealants, caulks, adhesives, polyester and phenolic dough and sheet compounds, vinyl flooring, EPDM sheet and other materials to provide fire barrier properties.

However, these frit compositions are not entirely suitable for use in certain materials, such as thermoplastics used in injection and extrusion moulding processes for forming end products, such as communications and electric power cables, electrical components, automobile, aircraft, domestic and industrial buildings and marine craft parts, and thermosetting materials and composites, such as glass reinforced resin laminates used for moulding storage tanks and the like.

In particular it has been found that the prior art frit compositions have an alkaline pH of the order of 10 which has precluded their use in some paints and sealants having an acid pH, such as those based on acrylic resins.

It has also been found that the softening temperature of 450° C. of a lower melting frit is too high for its use in some host materials, such as thermoplastics, because they degrade at much lower temperatures. The host material could be protected to over 450° C. by including alumina trihydrate, hydrated magnesium calcium carbonate or magnesium oxide but the volumes of these materials needed to be effective affects processing and properties of the end product.

An alternative is to use halogenated systems based on chlorinated paraffins or brominated materials with antimony trioxide or pentoxide. However, the use of these systems is being curtailed because of their carcinogenic properties and the increase in smoke production in a fire situation.

An object of this invention is to provide frit compositions having a wider range of uses than hitherto.

According to this invention there is provided a fire barrier material comprising a combination of substances capable of melting progressively as the temperature rises under fire conditions including a relatively high melting devitrifying frit and powdered zinc and/or tin to reduce melt and flow temperature of the frit.

The material according to the invention may also include a pH buffer and an intumescent substance. Preferably, the material also comprises a relatively low melting frit the frits being capable of melting progressively as the temperature rises under fire conditions.

The powder blends may further include one or more of the following substances selected from ammonium molybdenate, sodium pyrophosphate, ammonium monophosphate, ammonium polyphosphate, zinc borate, melamine, pentaerythritol and melamine phosphate.

The preferred substance pH buffer is one that reduces the pH of the frit compositions to a low alkalinity or neutral pH. A pH reduction to 8.5 or even 7 is desirable and would render the frit compositions of the invention capable of being used in aqueous acrylic resin based materials.

Compositions of the invention may be used in acid and ester cured thermosetting resins used in glass fibre reinforced structures. They may also be used in catalyst cured thermosetting resins, such as phenolic, epoxy and polyester resins, which would otherwise have the catalyst neutralised by the high pH of the blends.

Suitable pH buffers include phosphates, such as, for example, sodium pyrophosphate, ammonium monophosphate and ammonium polyphdsphate.

Another advantage of some of these buffer substances is their ability to generate gases under heat, such as when in combination with zinc borate, the gases cause foaming of the frit composition so that carbonaceous char from the hot material can fill the foam cavities to form a protective skin in a fire situation.

The substances to bring down malt and flow temperatures may be used singly or in combinations. A preferred combination produces a first melt zone in the range of 220 to 270° C., a second melt zone in the range 270 to 420° C. and a third melt zone in the range of 420° C. upwards.

One substance to bring down the melt and flow temperature of the frit compositions of the invention may be zinc borate. The inclusion of zinc borate which starts to function at 350° C. has proved effective in bringing the melt and flow temperature of the frit mix down. Magnesium carbonate and/or zinc spar may be added to the zinc borate to reduce melt temperature further. When used in conjunction with sodium pyrophosphate and the frit mix, the blend is inert until heated beyond 350° C. At that point the materials begin to fuse and the gas generated by the action of heat causes an intumescent action in the molten glass compound. A fine celled glass foam is produced without the inclusion of melamine as a blowing agent and pentaerythrytol as a carbonific which would be the normal specification to obtain this effect. It will be appreciated that the decreased trigger temperature of 350° C. may still not be low enough for the inclusion of frit compositions of the invention in some host materials.

It has been found that the inclusion of some powdered metals in the glass frit mix can bring the melt temperature of the blend down to a viable level, i.e. a temperature which will allow heat operated processes, such as injection moulding and extrusion, to be carried out without triggering the melt and flow characteristics within the equipment, whilst forming a protective char on the surface of the host material in a fire situation.

Powdered tin with a melt temperature of 228° C. may be used in a small quantity, as a catalyst, to promote a cascade effect. Powdered zinc with a melting temperature of 420° C. may be added as the second metal. Zinc borate may also be included as a third component. Tin, zinc and zinc borate can be mixed in any proportions for use in compositions of the invention. A mix of tin and zinc is the preferred blend for use in compositions of the invention.

There are possible electrical disadvantages when the frit mix fuses in a fire situation, particularly in electrical cable covering material. A covalent bond is the linkage of two atoms by the sharing of two electrons, one contributed by each of the atoms. The electrons are only shared equally when the atoms are identical and in most covalent bonds the electrons are held to a greater extent by one atom than the other, leading to electronegativity. Negative ions can be produced. The inclusion of materials with free positive ions can be of considerable benefit.

Tin is largely covalent in the +2 state. Zinc and zinc borate are in the +2 state, generally in octahedral or tetrahedral co-ordination and readily form complexes. The addition of small quantities of these metals can stabilise the electron balance during the process of fusion.

Zinc forms a bond with some of the components present in the frit mix. Zinc orthosilicate $Zn\ SiO_4$ forms a glass on heating which cannot have a continuous network of $SiO_4$ units because each is separated by a zinc atom. The zinc, therefore, takes on a network forming role, thus strengthening the glaze formed as the glass frit composition melts and flows. This contributes to the formation of a vitreous glaze on the surface of the char which stops oxygen ingress and the exit of smoke and toxic fumes. The production of these unburned gasses, which normally escape together and gather below ceiling level, before exploding, can be partially delayed by this glassy char. This means that the phenomenon known as 'flashover' can be minimised in some cases.

It is well known that powdered metals such as tin and zinc bum in air when strongly heated. When included in compositions or blends of the invention containing zinc borate and sodium pyrophosphate there is virtually no trace of this phenomenon. The hydrogen gas generated causes the molten composite to intumesce and form a fine cell glass foam when subjected to fire. This foam has the advantage of housing the carbonaceous char within its cells to give good insulation to the substrate. The hydrogen gas can also coat the surface of the char to act as an electrical insulator.

The char being an amalgam of glass and metal, has an intrinsic strength which can withstand wind and water spray to a much greater extend than the normal intumescent.

A preferred substance for use in compositions of the invention is mica. Mica is an aluminosilicate with layers of linked $(SiAP)O_4$ tetrahedra. Muscovite mica is a relatively soft mineral with a low co-efficient of expansion. It is electrically insulating, with good thermal stability and chemical resistance. When included with the frit blend, at a suitable particle size it contributes to the overall performance in a fire situation. It starts to evolve water vapour between 500° C. and 900° C. and it contributes to the flow characteristics by combining with the frit mix at temperatures between 600° C. and 800° C. Mica acts as a high temperature adhesive in these conditions, helping to hold the char together and stop cracking as the char cools.

Boric acid may be included in blends and compositions of the invention as a glass forming material at low temperatures. However, its degradation temperature of about 100° C. is too low for its inclusion in thermoplastic processing and it is almost totally water soluble. Therefore, before its inclusion in blends and composition of the invention it needs to be coated. A suitable coating material is a silicone oil, such as Dow Coming's silicone oil 1107, which serves to increase the degradation temperature to an acceptable level. Boric acid can be included in blends and compositions of the invention in amounts of from 5 to 100 pph.

The blends and compositions of the invention may be provided in powder form of such particle sizes that when incorporated in plastics materials allow for extrusion without blockage. Furthermore, the powders can be waterproof of sufficiently low degradation temperature to protect thermoplastics mouldings and extrusions without being triggered in the processing.

The composition of the invention can be all coated with a variety of materials which can help in mechanical and electrical properties. Amino silane has proved effective in EVA filled with Ath, stearate coating with polyethylene, polypropylenes, EPDM, and chorosulphonated polyethylene. The preferred coating is silicone orthosilicate 1107 from Dow Coming. This silicone polysiloxane allows the blends of the invention to be used in any material and gives a waterproof finish. This enables the coated material to be used in catalyst cure resins, such as phenolic, epoxy and polyester resins, without the catalyst being neutralised.

The invention will now be described by means of the following Examples:

Blends of powders were made up in a variety of compositions. The compositions of Examples 1 to 14 were subjected to the heat of a muffle furnace and a variety of temperatures and time scales. Notes were taken as to the temperature and duration of melt, flow, intumescence, and set characteristics and evaluation of electrical insulation, and levels of smoke and toxicity produced. Two standard frit mixes were used in all experiments. The first has a particle size of 30 micron and the second is at 5 microns. Mixes of the following materials in the ratios of 5 parts per hundred to 95 pph were made and tested in conjunction with each other, and individually as a sole additive, to the common material Ceepree® at 100 pph. The compositions of Examples 15 to 23 were subjected to the heat of a thermo-microscope from 200° C. to 1000° C. Photographs were taken together with data on the temperature and duration of melt, flow, intumescence and set characteristics and evaluation of electrical insulation and levels of smoke and toxicity produced. Mixes of the following materials in the ratios of 5 parts per hundred to 95 pph were made and tested in conjunction with each other, and individually as a sole additive, to the common devitrifying frit at 100 pph.

Example 1

| | |
|---|---|
| Ceepree ® at | 30 microns 100 parts |
| Tin at | 10 pph |
| Zinc at | 10 pph |
| Zinc Borate at | 10 pph |
| Sodium Pyrophosphate at | 10 pph |

This mix gave a melt and flow temperature of 230° C. with an intumescence starting at 450° C. and ceasing at 800° C.

Example 2

Ceepree® M at 5 microns 100 parts together with the formula as in Example 1. The results were very similar. The composition was more suitable for extrusion and injection moulding because of the small particle size, although more expensive to produce.

Example 3

As Example 2 but with the addition of 10 pph of fine ground mica. The result was an improved electrical insulation when compounded and extruded both at room temperature and in a simulated fire.

Example 4

| | |
|---|---|
| Ceepree ® at | 30 microns 100 parts |
| Tin at | 15 pph at 5 micron |
| Zinc at | 30 pph at 5 micron |
| Mica at | 30 pph at 5 micron |

Example 5

| | |
|---|---|
| Ceepree ® at | 5 microns 100 parts |
| Tin at | 15 pph at 5 micron |
| Zinc at | 45 pph at 5 micron |
| Mica at | 30 pph at 5 micron |

Example 6

| | |
|---|---|
| Ceepree ® at | 30 microns 100 parts |
| Tin at | 10 pph |
| Bismuth at | 5 pph |
| Zinc at | 20 pph |
| Zinc Borate at | 10 pph |
| Sodium Pyrophosphate at | 10 pph |

Example 7

| | |
|---|---|
| Ceepree ® C200 at | 30 microns 100 parts |
| Tin at | 10 pph |
| Mica at | 10 pph |
| Zinc at | 10 pph |
| Zinc Borate at | 10 pph |
| Sodium Pyrophosphate at | 10 pph |

Example 8

Ceepree® M at 5 microns 100 parts together with the formula as in Example 7. The results were very similar. The composition was more suitable for extrusion and injection moulding because of the small particle size, although more expensive to produce.

Example 9

As Example 8 but with the addition of 10 pph of fine ground ammonium molybdinate (AOM). The result was an improved electrical insulation and smoke reduction when compounded and extruded both at room temperature and in a simulated fire.

Example 10

| | |
|---|---|
| Ceepree ® at | 30 microns 100 parts |
| Tin at | 5 to 15 pph at 5 micron |
| Zinc at | 5 to 30 pph at 5 micron |
| Mica at | 5 to 30 pph at 5 micron |
| Zinc Borate at | 5 to 30 pph at 5 micron |

Example 11

| | |
|---|---|
| Devitrifying frit at | 5 microns 100 parts |
| Tin at | 5 to 15 pph at 5 micron |
| Zinc at | 5 to 45 pph at 5 micron |
| Mica at | 5 to 30 pph at 5 micron |
| Zinc Borate at | 5 to 30 pph at 5 micron |

Example 12

| | |
|---|---|
| Ceepree ® at | 30 microns 100 parts |
| ammonium molybdinate (AOM) at | 1 to 5 pph |
| Tin at | 10 pph |
| Zinc at | 20 pph |
| Zinc Borate at | 10 pph |
| Sodium Borate at | 10 pph |
| Sodium Pyrophosphate at | 10 pph |

Example 13

| | |
|---|---|
| Devitrifying frit at | 5 microns 100 parts |
| Tin at | 5 to 15 pph at 5 micron |
| Zinc at | 5 to 45 pph at 5 micron |
| Mica at | 5 to 30 pph at 5 micron |
| Zinc Borate at | 5 to 30 pph at 5 micron |
| Budit 3077 | 10 to 50 pph at 5 micron |

Example 14

| | |
|---|---|
| Devitrifying frit at | 5 microns 100 parts |
| Tin at | 5 to 15 pph at 5 micron |
| Zinc at | 5 to 45 pph at 5 micron |
| Mica at | 5 to 30 pph at 5 micron |
| Zinc Borate at | 5 to 30 pph at 5 micron |
| NH-1197 | 10 to 50 pph at 5 micron |

Example 15

| | |
|---|---|
| Devitrifying frit at | 30 microns 100 parts |
| Tin at | 5 pph |
| Zinc at | 10 pph |
| Zinc Borate at | 10 pph |
| Sodium Pyrophosphate at | 10 pph |
| Mica | 10 pph |

This mix gave a melt and flow temperature of 230° C. with an intumescence starting at 450° C. and ceasing at 800° C. Removing the sodium pyrophosphate gave a similar performance without the intumescence.

Example 16

Another mix, Ceepree® M at 5 microns 100 parts together with the formula as in Example 15 gave results which were very similar. The composition was more suitable for extrusion and injection moulding because of the small particle size, although more expensive to produce.

Example 17

As Example 16 but with the addition of 10 pph of fine ground mica. The result was an improved electrical insulation when compounded and extruded both at room temperature and in a simulated fire.

Example 18

| Devitrifying frit at | 30 microns 100 parts |
| Tin at | 1 to 25 pph at 5 micron |
| Zinc at | 1 to 30 pph at 5 micron |
| Mica at | 30 pph at 5 micron |

Example 19

| Devitrifying frit at | 5 microns 100 parts |
| Tin at | 1 to 25 pph at 5 micron |
| Zinc Borate | 1 to 30 pph at 5 micron |
| Zinc at | 1 to 45 pph at 5 micron |
| Mica at | 1 to 30 pph at 5 micron |

Example 20

| Devitrifying frit at | 30 microns 100 parts |
| Tin at | 1 to 30 pph |
| AOM (Molybdinate) at | 1 to 5 pph |
| Zinc at | 1 to 20 pph |
| Zinc Borate at | 1 to 40 pph |
| Sodium Pyrophosphate at | 1 to 30 pph |

Example 21

| Devitrifying frit at | 5 microns 100 parts |
| Tin at | 5 to 15 pph at 5 micron |
| Zinc at | 5 to 45 pph at 5 micron |
| Mica at | 5 to 30 pph at 5 micron |
| Zinc Borate at | 5 to 30 pph at 5 micron |
| Budit 3077 | 10 to 50 pph at 5 micron |

Example 22

| Devitrifying frit at | 5 microns 100 parts |
| Tin at | 5 to 15 pph at 5 micron |
| Zinc at | 5 to 45 pph at 5 micron |
| Mica at | 5 to 30 pph at 5 micron |
| Zinc Borate at | 5 to 30 pph at 5 micron |
| NH-1197 | 10 to 50 pph at 5 micron |

These blends were compounded into a range of thermoplastic materials including PVC, PVA, silicone and fluoropolymers, acrylics, EVA, PP, LDPE, PE, Nylon, EPDM and polyurethane, and thermosetting resins, such as polyester, epoxy and phenolic resins. The inclusion rate was in the 25 to 35% by weight range. There was some flaming but this was extinguished as the composite blend melted, flowed and intumesced. It was found that using a pentaerythrytol ester based plasticer, such as trade named Hemflex 707, gave a good flame and smoke suppression, particularly in PVC. Alumina trihydrate, hydrated magnesium calcium carbonate, and magnesium hydroxide can also be used as flame retardants but in significantly lower amounts than are normally specified. A Great Lakes powdered phosphate NH-1197, a general flame retardant, can be mixed with all of the above blends at a rate of 10 to 55 pph depending on the degree of flame retardancy required as can any of the appropriate Budit range.

Boric acid coated with Dow Coming's silicone oil 1107 may be included in any of the example formulae at 5 to 100 pph.

What is claimed is:

1. A fire barrier material comprising a devitrifying frit capable of melting as temperature rises under fire conditions, said material further comprising a substance to reduce melt and flow temperature of the frit, said substance comprising elements selected from a list of elements consisting of powdered tin and powdered zinc.

2. A fire barrier material as claimed in claim 1 wherein a relatively low melting frit is included in the material.

3. A fire barrier material as claimed in claim 2 wherein a pH buffer is included that reduces the pH of the material to a low alkalinity or neutral pH.

4. A fire barrier material as claimed in claim 3 wherein the pH buffer provides a pH reduction to 8.5 or lower.

5. A fire barrier material as claimed in claim 4 wherein the pH buffer includes phosphates.

6. A fire barrier material as claimed in claim 5 wherein the phosphates are selected from the group consisting of sodium pyrophosphate, ammonium monophosphate and ammonium polyphosphate.

7. A fire barrier material as claimed in claim 1 wherein said material comprises a combination of substances that produce a first melt zone in the range of 220 to 270° C., a second melt zone in the range of 270 to 420° C. and a third melt zone in the range of 420° C. upwards.

8. A fire barrier material as claimed in claim 1 wherein said material further comprises a temperature reducing constituent selected from the group consisting of magnesium carbonate and zinc spar.

9. A fire barrier material as claimed in claim 1 wherein said substance is powdered tin having a melt temperature of around 228° C.

10. A fire barrier material as claimed in claim 9 wherein said material further comprises powdered zinc with a melting point of around 420° C.

11. A fire barrier material as claimed in claim 9 wherein said material further comprises zinc borate.

12. A fire barrier material as claimed in claim 1 wherein said material further comprises mica.

13. A fire barrier material as claimed in claim 1 wherein the material is provided with a coating to improve its mechanical and electrical properties.

14. A fire barrier material as claimed in claim 1 wherein the material is provided in a powdered form.

15. A fire barrier material as claimed in claim 14 wherein said material further comprises at least one substance selected from the group consisting of ammonium molybdenate, melamine, pentaerythritol and melamine phosphate.

16. A fire barrier material as claimed in claim 1, said material further comprising an acid cured thermosetting resin.

17. A fire barrier material as claimed in claim 1, said material further comprising a catalyst cured thermosetting resin.

18. A composition comprising a fire barrier material as claimed in claim 1, said material further comprising an ester cured thermosetting resin.

* * * * *